United States Patent Office 3,060,517
Patented Oct. 30, 1962

3,060,517
FABRICATION OF MASSIVE SHAPED ARTICLES OF POLYTETRAFLUOROETHYLENE
Reuben Thomas Fields, Wilmington, Del., assignor to E. I. du Pont de Nemours and Company, Wilmington, Del., a corporation of Delaware
No Drawing. Filed Aug. 18, 1959, Ser. No. 834,383
7 Claims. (Cl. 18—55)

This invention relates to a novel method for the fabrication of shaped articles of polytetrafluoroethylene resins and more particularly to a new method capable of molding articles of complex shape from polytetrafluoroethylene granular powder.

It has been known heretofore that objects such as uniform sheets, cylinders, billets, or the like, made of polytetrafluoroethylene resins may be obtained by compressing granular polytetrafluoroethylene resin under high pressure to a self-supporting structure called a preform and thereafter sintering the preform to give a finished shape.

In such processes it is essential that the mold be of uniform depth so that in the compacting process the resultant force in the granular polytetrafluoroethylene resin particles is substantially uniaxial. The use of molds of non-uniform cross section, and particularly large molds, tends to cause the formation of slippage flaws in the preform. Slippage flaws are essentially due to shear forces within the compacting mass, the partially compacted material fracturing under the said shear forces yielding slick surfaces which will not heal together in the sintering process and thereby become mechanical flows in the finished object.

The term "polytetrafluoroethylene granular powder" used herein is employed in its conventional sense to refer to polytetrafluoroethylene resins in the form of rough sponge-like particles of supercolloidal dimensions having a total surface area of from 1 to 4 square meters per gram as measured by nitrogen absorption (for example, by the method described in Chapter XII of Scientific and Industrial Glassblowing and Laboratory Techniques by E. E. Barr and Victor J. Anhorn published in 1949 by Instruments Publishing Company). This value corresponds to a theoretical average particle diameter of 0.67 to 2.67 microns based on the assumption that all particles are spherical. Such products may be obtained by contacting tetrafluoroethylene; in the absence of organic additives, with an agitated aqueous solution of an inorganic peroxide catalyst as described by Brubaker in U.S. Patent 2,393,967. These granular polytetrafluoroethylene powders are to be distinguished from the "fine powders" which are characterized by a much greater surface area per unit weight, and which may be extruded when lubricated to give tapes, ribbons, wire coatings and like articles which may then be dried and sintered.

It is an object of the present invention to provide a new and useful method for the fabrication of polytetrafluoroethylene resins into shaped articles. Another object of this invention is to provide a method for the fabrication of articles having an irregular cross section from polytetrafluoroethylene granular powder. Yet another object of the present invention is to provide a novel method for the manufacture of shaped articles of polytetrafluoroethylene resins which greatly reduces the occurrence of slippage flaws and porosity. Other objects will appear hereinafter.

The above objects are achieved by wetting the granular polytetrafluoroethylene powder with a lubricant, compressing the wet powder in a rigid mold at a temperature from about 50 to 250° C., drying the resultant preform, further compacting the dried preform in a mold with a resilient compacting surface, and sintering the compacted preform.

The invention will be better understood by reference to the following explicit examples which should not, however, be construed as defining the scope of this invention.

*Example I*

Cup-shaped objects 8½" in height, 7½" in outside diameter with a wall thickness of approximately one-half inch were molded without flaws by the following procedure:

1900 grams of a granular polytetrafluoroethylene powder sold under the trademark "Teflon" 5 polyTFE resin was intimately mixed at room temperature with 335 grams of chlorobenzene and poured into a mold preheated to 150° C. through a 1½" diameter knock-out plug opening. The shell of the mold was made of polished aluminum and was elevated 2½" in order to make the cavity large enough to contain the total charge. The knock-out plug was then replaced and the mold allowed to close, sufficient time being taken to warm the polymer granules. The mold was then placed in a hydraulic press and a pressure of 15 tons (800 lbs./square inch of projected area) was applied slowly. Excess lubricant was squeezed out of the wet mass and passed through the walls of the male portion of the wet forming die which was constructed of porous bronze permeable to the lubricant. Such porous metal may be made by the techniques of powder metallurgy, or may be purchased commercially. The molded shape was then removed from the hot die and placed in a ventilated hot air oven at 150° C. for a few hours to remove the lubricant. While the preform was drying, a second, compacting, mold was made ready. This mold consisted of female mold of vulcanized rubber in a steel shell. The rubber was at least 1¾" thick at all places. The rubber was lubricated relative to the shell by means of a thin sheet of polytetrafluoroethylene resin which enabled the rubber to slip freely when the pressure was applied. The male part of the mold was constructed of polished aluminum set on a cylindrical plunger which was a close fit inside the steel retaining cylinder of the female section. When the mold was closed, the head of the male mold compressed the rubber within the steel shell and thereby transmitted pressure uniformly over the preform, the rubber acting as a hydraulic transmission fluid. The second mold was congruent in shape with the wet preforming mold. Before use it was heated to 150° C., the same temperature as the wet-forming mold. The dried preform was placed in the second mold having the resilient surface and compacted at a pressure of 2,000 lbs./square inch based on the overall cross-sectional area of the rubber within the steel shell of the second mold. The pressure was then released and the finished preform was removed and sintered at 380° C. in an air oven for 1½ hours. The resultant shape was sectioned and examined carefully but no slippage flaws could be detected. No discoloration due to the decomposition of small amounts of lubricant were observed in the sections. The density was found to be 2.16 after sintering indicating a well-finished, non-porous article. Preforms, made from wetted powder, which had been dried but not compacted were highly porous after sintering.

*Example II*

Using the same molding procedure and molds as in Example I, cup-shaped objects were molded using a mix of 1900 grams of granular polytetrafluoroethylene powder intimately mixed with 335 grams of tetrachloroethylene. A well-formed molding free from internal flows was obtained. No discoloration of the interior of the article was found.

*Example III*

A mix was made of 80% of granular polytetrafluoroethylene powder, and 20% of carbon tetrachloride. From the mix hemispherical objects with a projected diameter of 1¼″ were molded using a porous male die and a solid female die. One cup was pressed at 6,000 p.s.i. and the other at 10,000 p.s.i. The objects were dried overnight in an air oven at 100° C., then repressed in a mold, the female section of which was lined with ⅜″ of rubber, the inside being congrument with the original die. A pressure of 5000 lbs. was employed with each object. The shapes were then sintered on a tray in an air oven at 380° C. They were taken from the area and allowed to cool. No flaws were detected in either case.

Example IV

The procedures of Example III were repeated using 20% by weight of White Oil No. 30, a kerosene fraction boiling between 220° C. and 243° C. as a lubricant. The drying step was conducted at 150° C. overnight. A well-formed article free from flaws and with no internal discoloration was obtained.

With regard to the lubricant which may be used in the practice of this invention, any stable organic liquid, having a suitable boiling point and generally inert to the materials employed for the molds, is suitable. It is essential that the lubricant should not boil at a temperature greatly below that to which the wet-forming mold is preheated. In general, the boiling point should not be more than 20° C. and preferably not more than 10° C. less than the mold temperature. On the other hand, it is also desirable that lubricants having molecules of relatively small dimensions and having a low boiling point should be employed in order to assist the diffusion and vaporization of the solvent from the wet preform in the drying step.

The amount of lubricant should, in general, be at least 5% by weight and preferably greater. Larger amounts of lubricant assist the pourability of the granular molding powder. On the other hand, excess solvent may be removed through the porous walls of the wet preforming mold, and hence does not materially affect the character of the wet preform. In general, a quantity of lubricant equal to about 20% by weight of the dry polytetrafluoroethylene granular powder is suitable and generally not more than 30% of lubricant by weight should be employed.

In general, it has been found essential to employ higher temperatures in conjunction with the lubricant in order to obtain suitable wet preforms. The particular temperatures are not highly critical. Preforms may be obtained at temperatures as low as 50° C. but higher temperatures give better results in general and are preferred. A temperature of 150° C. has been found to give good results with difficult moldings. The wet preforming temperature should not exceed about 250° C. since the high boiling lubricants which must be employed at the higher temperatures are extremely difficult to remove without damage to the preform.

The wet preforming operation is carried out in a rigid mold. It is extremely desirable to provide vents in the mold for excess solvent. A preferred method for accomplishing this result is to employ one or more porous sections to the mold constructed from sintered powdered metals and permeable to the lubricant employed. Porous bronze is a suitable material and may be obtained as an article of commerce, but other porous metals may be used. Either the male or the female portion of the mold may be constructed of the porous material, or the plug employed to close the mold may be so constructed or inserts of porous metal in the mold sections may be employed for the larger molds.

The impermeable members of the molds are preferably constructed of metals such as steel or aluminum but it will be obvious that any material which will withstand the applied stress at the temperatures of molding, and the chemical and solvent action of the lubricant at these temperatures, may be employed.

With regard to the resilient mold employed to compact the dried preform, vulcanized natural or synthetic rubber has been found excellent as a liner, but other elastomeric materials may be used or fluids confined in an elastomeric shell may be used. The thickness of the resilient mold which is essential for the production of flawless moldings will vary with the size of the mold and will depend in part on the shape of the molding. As a rough guide the thickness of the resilient lining should be at least 25% of the projected diameter of the mold. Greater thickness of resilient material may be employed with greater total pressures on the mold corresponding to the increased overall area of the hydraulic transmission medium.

The pressure employed in the wet preforming step is generally not highly critical and pressures as low as 300 lbs./square inch based on the projected area of the molded object may be used successfully. Pressures as high as 10,000 lbs./square inch of projected area have also been found operable. Higher pressures tend to introduce slippage flaws even with the lubricated material and should be avoided.

The compacting step is generally performed at a pressure in the range of 500 to 5,000 lbs./square inch based on the projected area of the resilient compacting surface. The resilient material operates as a hydraulic medium to transfer the pressure uniformly to the surface of the dried preform. Again, the pressure employed does not appear to be highly critical, but excessive pressures tend to yield moldings having flaws, while insufficient pressure in the compacting step tends to produce molding which are porous.

The dry compacting stage may be performed at any suitable temperature below about 300° C., but it is preferred to employ the same temperature as that used with the wet preforming mold. At that temperature it has been found that the dried preform will fit readily into a compacting mold which is congruent in shape with the wet preforming mold. If the compacting step is performed at a temperature differing substantially from that of the wet preforming operation, for example, at room temperature, it has been found that the dried preform will not fit into a congruent mold and may split if pressure is applied. The preform compacting step may be performed at other temperatures provided due allowance is made for the shrinkage of the preform in the design of the compacting mold.

The sintering process is carried out at temperatures which exceed the crystalline melting point of 327° C. At temperatures close to the crystalline melting point the sintering process is unduly slow. Sintering is greatly accelerated as the temperature is increased. Temperatures in excess of 400° C. should not be employed or some decomposition of polytetrafluoroethylene resins will take place. A temperature in the range of 350° C. to 390° C. is, therefore, preferred.

Some objects of complex shape may tend to warp due to shrinkage of the preform during the sintering process. Such warping may be avoided by sintering the preform stretched over a shaping frame. If more exact dimensions are required the sintered article may be "coined" by pressing the jelly-like molten shape in a metal mold at a pressure from 1,000 to 5,000 lbs./square inch and allowing the shape to cool in the coining press.

Polytetrafluoroethylene fine powders which are characterized by a far greater surface area per unit weight, and which have been used for the extrusion of simple shapes in a lubricated condition are not suitable for the practice of this invention. Moldings made from such fine powders tend to crack and are severely discolored from the decomposition products of traces of occluded lubricant which are extremely difficult to remove in the drying operation.

The present invention is particularly suited for the manufacture of massive shaped articles having a non-uniform section. Such articles, which it was necessary to machine from solid billets heretofore, can now be fabricated with far greater facility and without wastage of valuable resin. It will be recognized, however, that sheets, billets, and other simple shapes which could be made by the methods of the prior art for molding polytetrafluoroethylene granular powder can also be made by the novel process of this invention.

What I claim is:

1. Process for making machine shaped articles of irregular cross section from polytetrafluoroethylene granular powder which comprises, in sequence, the steps of wetting the said powder with at least 5% by weight of a low-boiling lubricant, compressing the wetted powder to a preform at a temperature in the range of 50° C. to 250° C., drying the preform, compacting the dried preform in a mold having a resilient compacting surface at a pressure of from 500 to 5000 lbs./square inch of projected area, and at a temperature below about 300° C., and sintering the compacted preform at a temperature in the range of 327° C. to 400° C.

2. Process, according to claim 1, wherein said wetted powder is compressed in a mold having walls permeable to said lubricant.

3. Process, according to claim 2, wherein said wetted powder comprises 5 to 30% by weight of said lubricant.

4. Process, according to claim 3, wherein said wetted powder is compressed under a pressure in the range of 300 to 10,000 lbs./square inch of projected area.

5. Process, according to claim 4, wherein said dried preform is compacted in a congruent mold at a temperature equal to that of the wet preforming mold.

6. Process, according to claim 5, wherein said compacted preform is sintered at a temperature in the range of 350° C. to 390° C.

7. Process for making massive shaped articles of irregular cross section from polytetrafluoroethylene granular powder which comprises wetting said powder with from 5% to 30% by weight of a kerosene fraction boiling between 220° C. and 243° C., compressing the said wetted powder to a preform in a mold having walls permeable to said kerosene fraction at a temperature in the range between 50° C. and 250° C., drying the preform at a temperature of about 150° C., compacting the dried preform in a congruent mold having a resilient compacting surface at a pressure in the range between 500 and 5000 lbs./square inch and at a temperature substantially equal to that of the wet preforming mold and sintering the compacted preform at a temperature in the range of 350° C. and 390° C.

References Cited in the file of this patent

UNITED STATES PATENTS

| | | |
|---|---|---|
| 2,440,190 | Alfthan | Apr. 20, 1948 |
| 2,456,262 | Fields | Dec. 14, 1948 |
| 2,644,803 | Lontz | July 7, 1953 |
| 2,710,991 | Squires | June 21, 1955 |
| 2,715,617 | White | Aug. 16, 1955 |
| 2,752,637 | Walker | July 3, 1956 |
| 2,915,786 | Haroldson et al. | Dec. 8, 1959 |
| 2,928,134 | Deakin | Mar. 15, 1960 |
| 2,929,109 | Cresap | Mar. 22, 1960 |

UNITED STATES PATENT OFFICE
CERTIFICATE OF CORRECTION

Patent No. 3,060,517 October 30, 1962

Reuben Thomas Fields

It is hereby certified that error appears in the above numbered patent requiring correction and that the said Letters Patent should read as corrected below.

Column 2, line 68, for "flows" read -- flaws --; column 5, line 9, for "machine" read -- massive --; column 6, line 24, for "2,644,803" read -- 2,644,802 --.

Signed and sealed this 16th day of April 1963.

(SEAL)
Attest:

ERNEST W. SWIDER
Attesting Officer

DAVID L. LADD
Commissioner of Patents